United States Patent
Yeh et al.

(10) Patent No.: US 7,434,827 B2
(45) Date of Patent: *Oct. 14, 2008

(54) SINGLE HAND FOLDING STRUCTURE FOR UMBRELLA FOLDING STROLLER

(75) Inventors: Chuan-Ming Yeh, Tai Pao (TW); Youn-Fu You, Tai Pao (TW); Wei-Yeh Li, Tai Pao (TW)

(73) Assignee: Link Treasure Limited, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 11/379,758

(22) Filed: Apr. 21, 2006

(65) Prior Publication Data

US 2006/0197313 A1 Sep. 7, 2006

Related U.S. Application Data

(63) Continuation-in-part of application No. 11/059,514, filed on Feb. 16, 2005, now Pat. No. 7,108,275.

(30) Foreign Application Priority Data

Feb. 18, 2004 (TW) .............................. 93202330 U

(51) Int. Cl.
*B62B 1/00* (2006.01)
*B62B 5/00* (2006.01)
(52) U.S. Cl. ...................... 280/642; 280/639; 280/647; 280/650; 280/657
(58) Field of Classification Search ................. 280/650, 280/642, 644, 47.38, 652, 658, 657, 647, 280/639, 651
See application file for complete search history.

(56) References Cited

U.S. PATENT DOCUMENTS

| 3,995,882 | A |   | 12/1976 | Watkins ....................... 280/649 |
| 4,019,757 | A |   | 4/1977  | Beger et al. .................. 280/649 |
| 4,042,249 | A |   | 8/1977  | Kassai .......................... 280/38 |
| 4,111,454 | A |   | 9/1978  | Kassai ......................... 280/649 |
| 4,118,052 | A |   | 10/1978 | Cabagnero .................. 280/642 |
| 4,152,010 | A |   | 5/1979  | Kassai ......................... 280/650 |
| 4,171,829 | A |   | 10/1979 | Toda .......................... 280/649 |
| 4,266,807 | A |   | 5/1981  | Griffin ........................ 280/650 |
| 4,353,577 | A |   | 10/1982 | Giordani ..................... 280/642 |
| 4,362,315 | A | * | 12/1982 | Kassai ......................... 280/650 |
| 4,386,790 | A |   | 6/1983  | Kassai ......................... 280/650 |
| 4,648,651 | A |   | 3/1987  | Hawkes ....................... 297/45 |
| 4,753,453 | A |   | 6/1988  | Schilbach ................... 280/643 |

(Continued)

*Primary Examiner*—Hau V Phan
(74) *Attorney, Agent, or Firm*—Alan Kamrath; Kamrath & Associates PA

(57) ABSTRACT

A single hand folding structure for an umbrella folding stroller includes a folding set to connect between a pair of side frames of the stroller. The folding set is provided with a driving lever, and a driver is arranged at one of the side frames. A connecting element connects between the driver and the driving element. When a user folds the stroller, the user can pull the driver to move the driving lever via the connecting element and force the folding set to fold so the two sides of the frame are moved inward closely to each other. An elastic element of the frame is utilized to assist the folding of the frame such that the user can fold the frame of the stroller easily and effortlessly. Thus, the user can operate with a single hand, without using a foot, to release the frame to fold.

4 Claims, 6 Drawing Sheets

U.S. PATENT DOCUMENTS

| | | | |
|---|---|---|---|
| 4,930,697 A | 6/1990 | Takahasi et al. | 280/47.38 |
| 4,986,564 A | 1/1991 | Liu | 280/642 |
| 5,288,098 A | 2/1994 | Shamie | 280/642 |
| 5,535,483 A | 7/1996 | Cagbagnero | 16/429 |
| 5,669,623 A * | 9/1997 | Onishi | 280/642 |
| 5,863,061 A | 1/1999 | Ziegler et al. | 280/642 |
| 6,068,284 A * | 5/2000 | Kakuda | 280/642 |
| 6,322,098 B1 | 11/2001 | Lan | 280/642 |
| 6,375,213 B1 | 4/2002 | Suzuki | 280/649 |
| 6,386,575 B1 | 5/2002 | Turner | 280/647 |
| 6,776,433 B2 | 8/2004 | Harrison et al. | 280/647 |
| 6,811,178 B2 | 11/2004 | Tomasi et al. | 280/650 |
| 6,814,368 B2 * | 11/2004 | Cheng | 280/642 |
| 6,820,891 B2 * | 11/2004 | Suga | 280/642 |
| 6,860,504 B2 * | 3/2005 | Suga et al. | 280/642 |
| 6,877,762 B2 | 4/2005 | Yamazaki | 280/647 |
| 7,108,275 B2 * | 9/2006 | Yeh et al. | 280/647 |
| 2003/0155746 A1 | 8/2003 | Watkins | 280/650 |
| 2005/0212264 A1 | 9/2005 | Yeh et al. | 280/647 |

* cited by examiner

SINGLE HAND FOLDING STRUCTURE FOR UMBRELLA FOLDING STROLLER

CROSS-REFERENCE

The present application is a continuation-in-part application of U.S. patent application Ser. No. 11/059,514 filed on Feb. 16, 2005, now U.S. Pat. No. 7,108,275.

FIELD OF THE INVENTION

The present invention relates to a structure for an umbrella stroller, wherein the structure is utilized to allow a user to release the stroller by a single hand. Moreover, the structure is handy as well as laborsaving for the user when the stroller is folded in a collapsed position for storing.

BACKGROUND OF THE INVENTION

Strollers are designed for carrying babies around. Conventional strollers have a foldable structure so as to reduce the overall size of the stroller when carried around or when in storage.

The conventional foldable strollers, as shown in FIG. 1, have various types and forms and are divided into transport strollers and umbrella folding strollers according to their collapsed status. The umbrella folding strollers employ a frame 90 utilizing a pair of lower cross tubes 92 and a folding set 93 so as to fold the two sides of the frame 90 as an umbrella. The main purpose is to reduce the size of the stroller when carried around or when in storage. However, when a conventional umbrella folding stroller is folded, the folding set 93 disposed on the bottom of the back of the frame is utilized so as to control the folding of the frame of the stroller. The conventional folding set 93 includes two pairs of upper and lower steel pieces 94, 95, a conduit piece 96, a pair of connecting steel pieces 97, a driving piece 98, and a paddle 99. When the frame 90 is folded, the folding set 93 is subsequently folded by lifting the paddle 99 using the top surface of the user's shoe. The conduit piece 96 simultaneously folds the upper and lower steel pieces 94, 95 into an inverted V shape, so that the driving piece 98 pushes said pair of connecting steel pieces 97 to close the two sides of the frame 90 inward. Then, the user pushes the handle bar 91 so as to form the folding position of the frame 90. In contrast, when the user expands the frame 90, the user steps on the paddle 99 such that each steel piece 94, 95, 97 is expanded towards an opposite direction so as to form the expanding position. However, the folding process is very inconvenient, and the user's shoe may be damaged during the process.

SUMMARY OF THE INVENTION

The main object of the present invention is to overcome the inconvenience of folding the conventional folding stroller by foot and the issue of damaging the user's shoes. The present invention mainly includes a folding set which is provided with a driving lever and a driver. A connecting element connects between the driver and the driving lever, wherein the driver can be pulled to move the driving lever via the connecting element and force the folding set to fold so that the two sides of the frame are moved inward closely to each other. Thus, a user can release the folding set with the user's one hand.

In addition, the present invention provides an elastic element of the frame utilized to assist the folding of the frame such that the user can easily and effortlessly push the handle bar to fold the frame. Therefore, the user can directly push the handle bar so as to fold the frame of the stroller.

Moreover, the present invention provides an arresting member which can slidably move on the frame. The driver is rotatable by releasing the arresting member so as to prevent unexpected folding by the user.

Other features and advantages of the invention will become apparent from the following detailed description, taken in conjunction with the accompanying drawings.

DETAILED DESCRIPTION OF THE EMBODIMENTS

Figure 1:
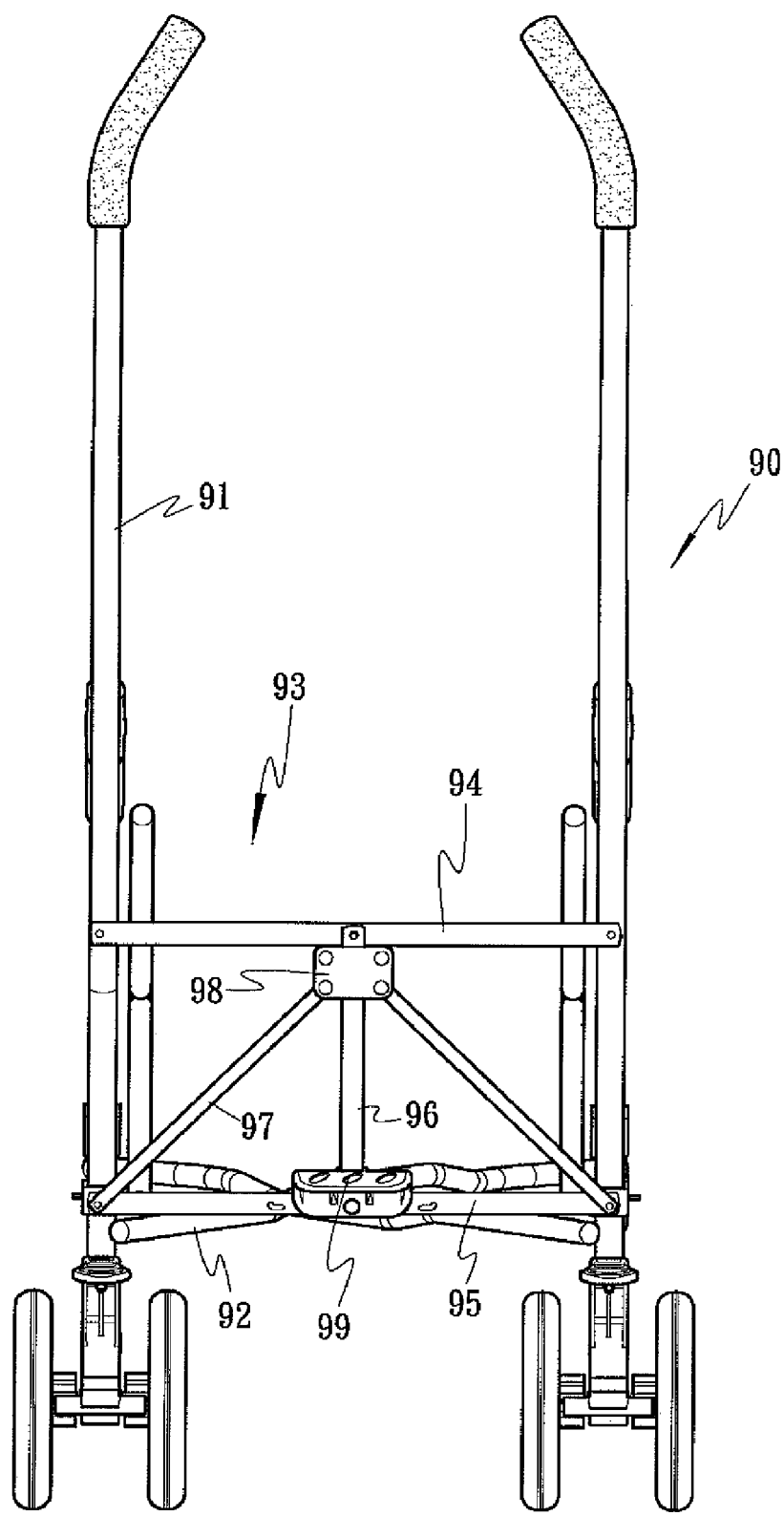
FIG. 1 is a schematic rear view of a prior umbrella folding stroller frame in an expanded position.
Figure 2:
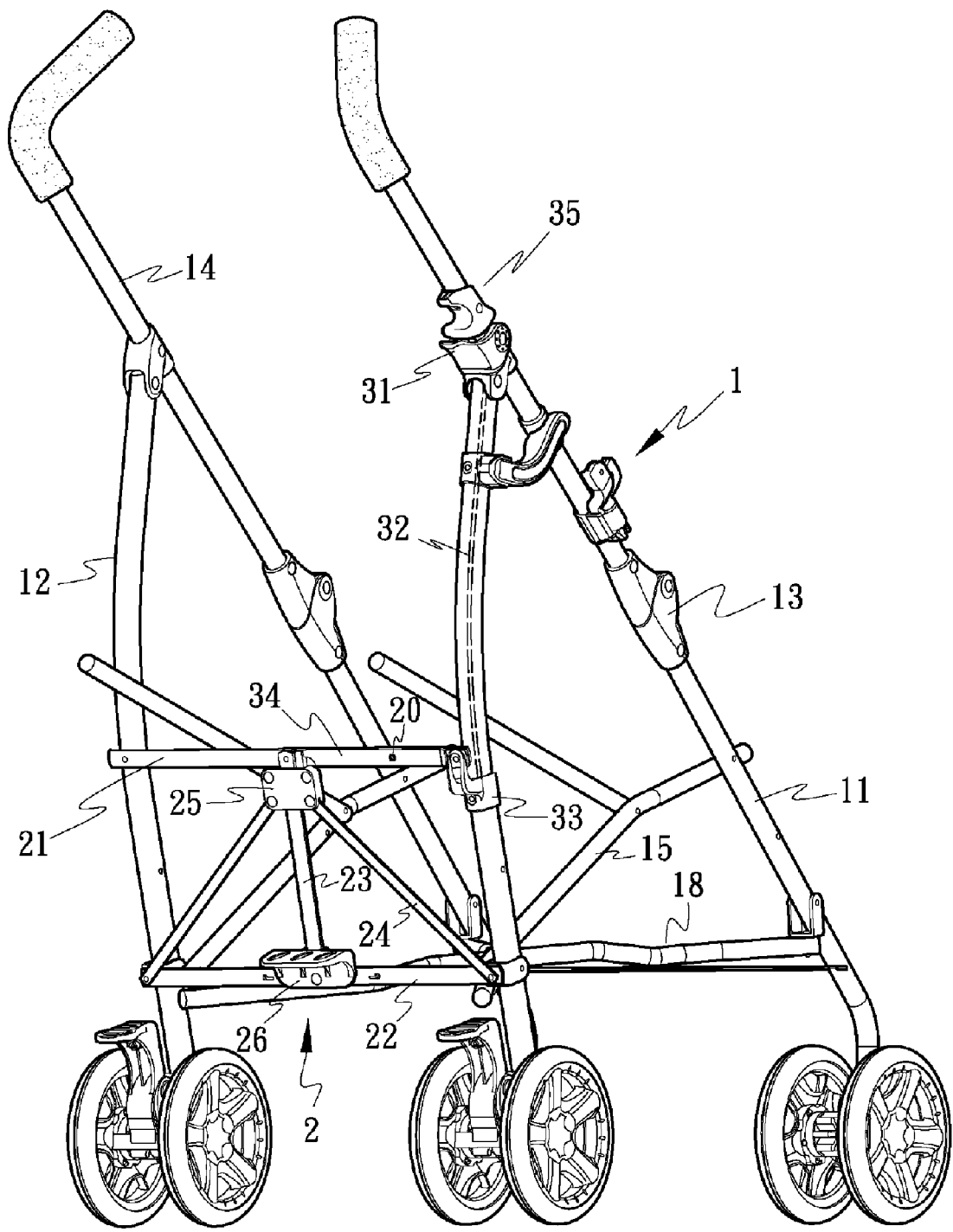
FIG. 2 is a three dimensional rear view of the present invention.
Figure 3:
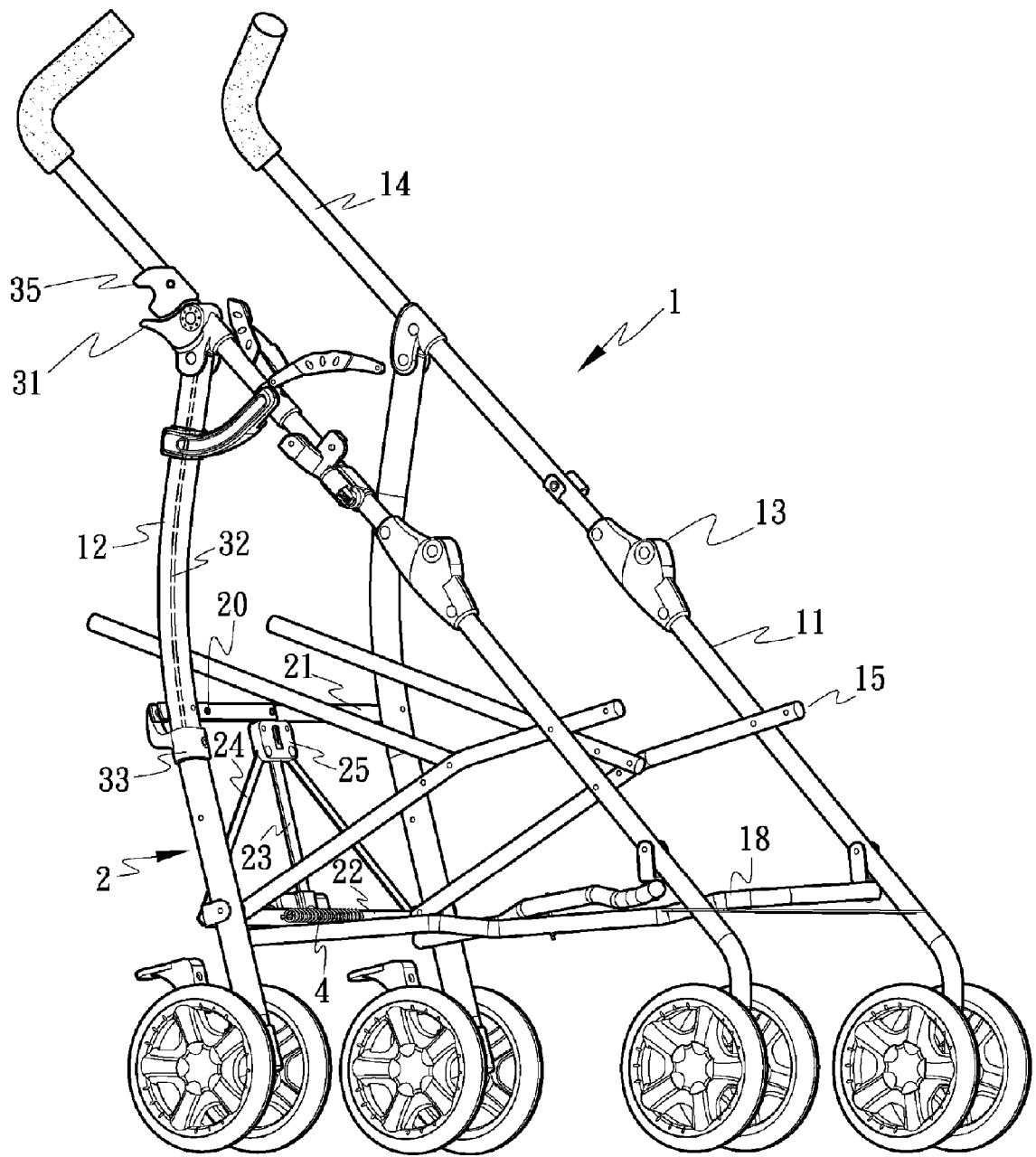
FIG. 3 is a three dimensional front view of the present invention.

Referring to FIGS. 2 and 3, the present invention provides a single hand folding structure for an umbrella folding stroller so as to allow a user to fold a frame 1 of the stroller by a single hand, without using a foot to release the frame 1. The present invention includes the frame 1 which may be extendable for operations and folded for storing. The frame 1 includes front and rear leg tubes 11, 12 connected to each other, a joint set 13, a handle bar 14, a seat tube 15, a folding set 2, and a lower cross tube 18. The lower cross tube 18 and the folding set 2 are pivotally coupled on a lower side and a rear side between two sides of the frame 1 respectively for supporting the frame 1 of the umbrella folding stroller. When the frame 1 is collapsed, the left and right sides of the frame 1 are driven to fold.

Figure 4:
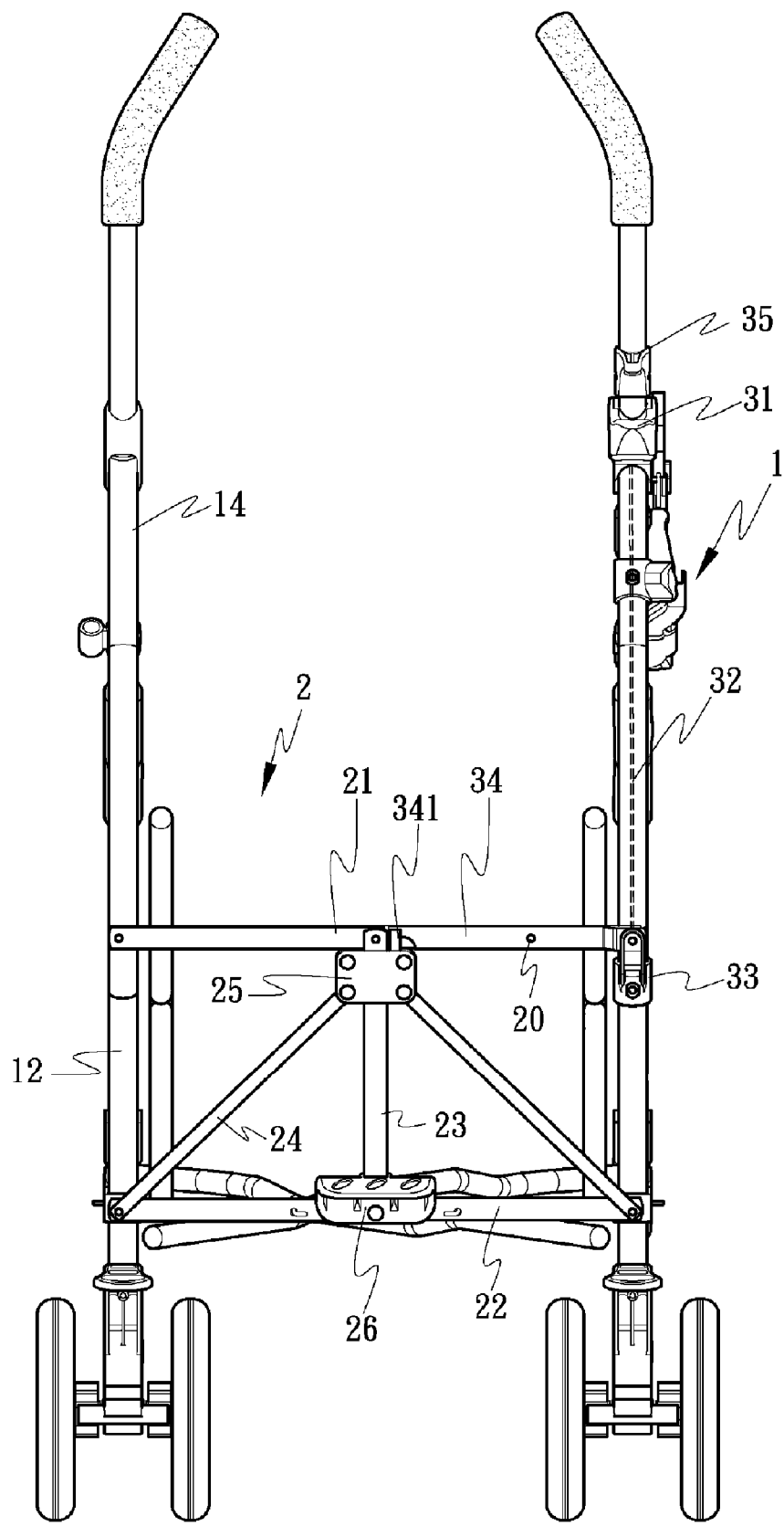
FIG. 4 is a schematic rear view of the present invention.
Figure 5:
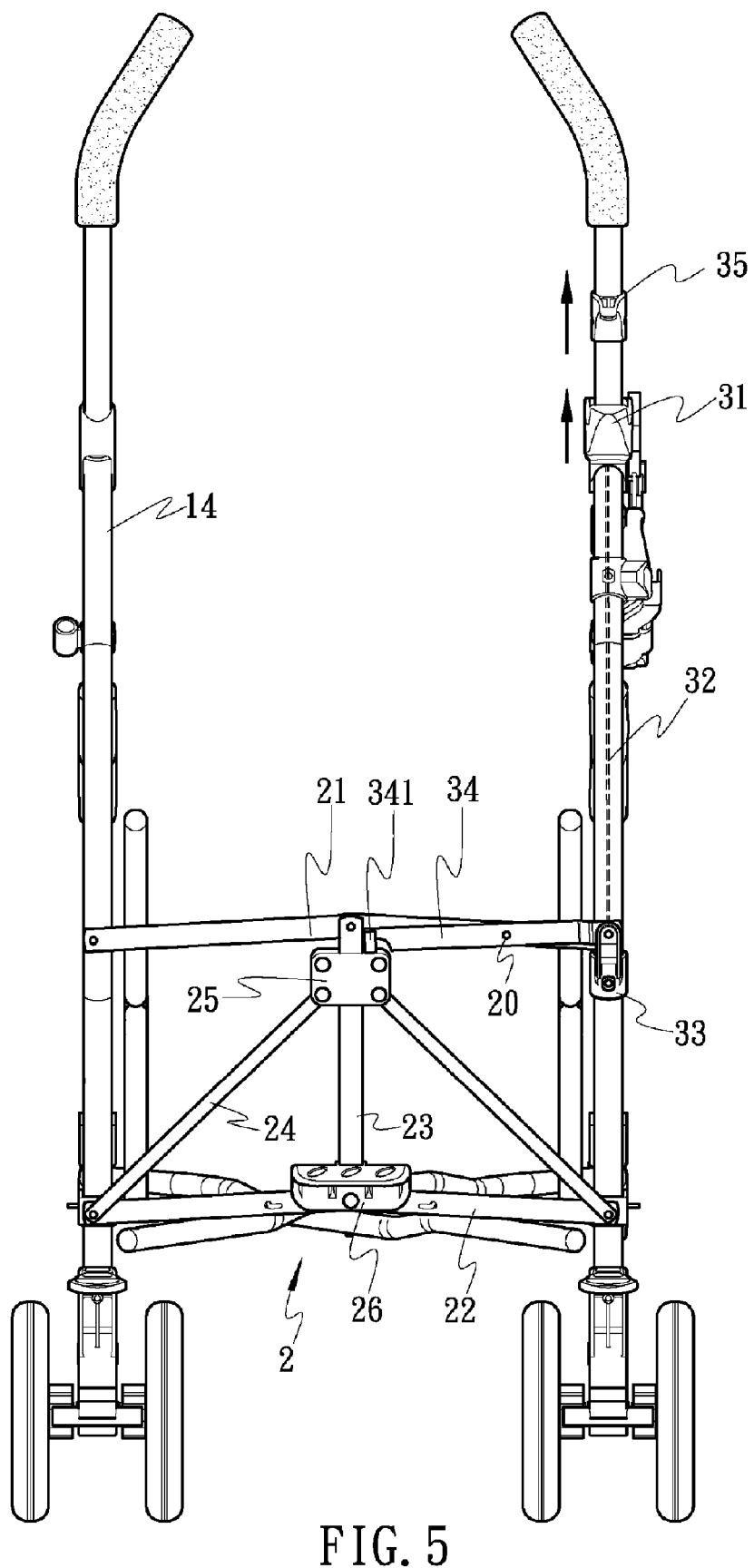
FIG. 5 is a schematic view of a folding movement of the folding set of the present invention.
Figure 6:
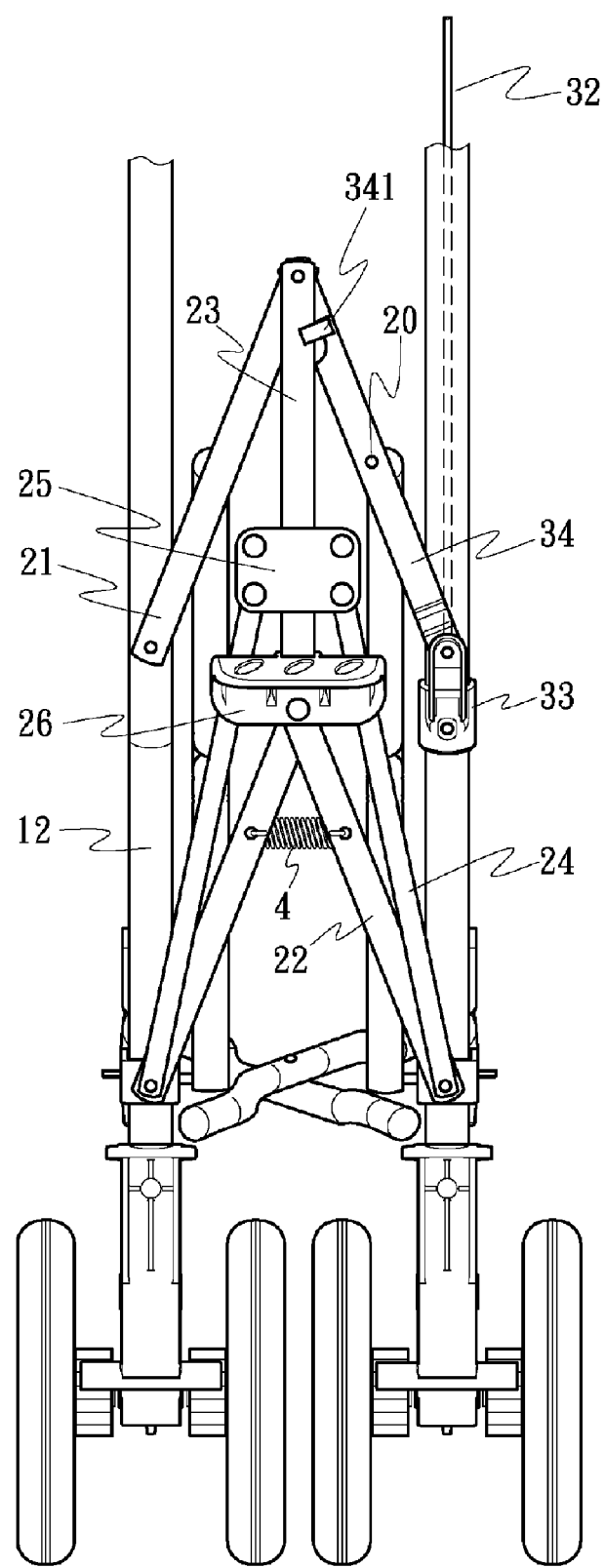
FIG. 6 is a schematic view of the folding set of the present invention after being folded.

Referring to FIGS. 4 and 5, the folding set 2 is pivotally connected between the rear leg tubes 12 of the frame 1. The folding set 2 includes two pairs of upper and lower steel pieces 21, 22, a conduit piece 23, a pair of connecting pieces 24, a driving piece 25, and a paddle 26, each pivotally connected to one another. Through the expanding and releasing of the folding set 2, the expanding position or the folding position of the frame is controlled.

The single hand release structure in accordance with this embodiment of the present invention includes a hand pull driver 31, a connecting element 32, a driving sleeve 33, a driving lever 34, and a return spring (not shown). The hand pull driver 31 can slidably move on the handle bar 14 of the frame 1 or can be arranged according to the height of the user or the frame such as at upper end of the rear leg tube 12 or between the handle bar 14 and the rear leg tube 12 so as to provide the user with ease of operation within arm's reach. In this embodiment, the connecting element 32 is a flexible wire having one end connected to the driver 31. The other end of the wire is connected to the driving sleeve 33 which is capable of sliding on the rear leg tube 12. In addition, as shown in FIGS. 4 and 5, the driving lever 34 is pivotally connected to the upper steel piece 21 of the folding set 2. One end of the driving lever 34 is connected to the driving sleeve 33, and the other end is against the driving piece 25.

Therefore, when the user pulls the driver 31 upward, the driving lever 34 rotates in relation to the connecting element 32 and the driving sleeve 33. The driving lever 34 and the upper steel piece 21 are rotated at the connecting point 20 therebetween. The other end of the driving lever 34 is a free end 341 and is located against the upper part of the driving piece 25 to form a pivot point. Thus, when the upper steel piece 21 is lifted via the connecting point 20, the conduit piece 23 moves upwardly and as the upper steel piece 21 swings upwardly. Two sides of frame 1 are drawn close so as to facilitate the folding of the folding set 2.

In addition, when the user pulls the driver 31, the folding set 2 is merely presented in a foldable position. However, none of the folding points on the frame 1 of the umbrella folding stroller have moved entirely. If the user directly pushes the handle bar 14 at this time, each element cannot rotate in relation to the handle bar 14 so as to fold the frame 1.

Referring to FIG. 3, an elastic element 4 is disposed between the lower steel pieces 22 of the folding set 2. When the frame 1 of the umbrella folding stroller is expanded, the elastic element 4 stretched. However, the two lower steel pieces 22 remain unaffected due to their same alignment with the elastic element 4. When the user releases the folding set 2, each folding point on the frame 1 becomes rotatable so that the folding set 2 can easily pass all the deadlock points through the return elasticity of the elastic element 4. Moreover, after passing all the deadlock points, the folding set 2 can further force to close the two sides of the frame 1 automatically through the return elasticity of the elastic element 4. Therefore, the user can operate the folding of the stroller by a single hand simply and effortlessly.

Further, in order to avoid operation by the user pulling the driver 31 directly and as a result to fold the frame 1 unexpectedly, the present invention provides an arresting member 35 which is disposed slidably above the driver 31. The arresting member 35 stops the rotation or movement of the driver 31 when closely against the driver 31. On the contrary, the driver 31 can be moved when the arresting member 35 is away from the driver 31. The arresting member 35 is retained above and against the driver 31 by the elasticity of a spring (not shown). Therefore, the user can never pull the driver 31 directly and unexpectedly for safety concerns.

Therefore, in the embodiment, the elastic element 4 can also be a torsion spring. By disposing the torsion spring device at the connecting point between the rear leg tube 12 and the seat tube 15, the return torsion can be utilized to release the steel pieces 22. Then, the rear leg tube 12 and the seat tube 15 can correspondingly rotate to form the partial folding position of the frame 1. Subsequently, the user can directly push the handle bar 14 so as to fold the frame of the stroller.

The above-mentioned preferred embodiments of the present invention are not intended to limit the scope of the present invention. Modifications and changes may be made in various embodiments of the present invention without leaving the scope and spirit of the present invention. The scope of the present invention is limited only by the language of the following claims.

What is claimed is:

1. An umbrella folding stroller comprising:
    a frame having right and left sides, with a folding set disposed between the right and left sides of said frame so as to drive said frame to extend in an extended position or to fold in a collapsed position for storing, wherein said folding set includes upper lower folding braces with each folding brace including a pair of steel pieces, with, each said pair of steel pieces pivotally connected together at a pivotal spot with an outer side of each steel piece pivotally affixed on a back side of said frame, with the folding set further including a conduit piece having two ends, with the two ends of the conduit piece pivotally connected to the pivotal spots of the upper and lower folding braces respectively, with the folding set further including a driving piece slidably provided on the conduit piece;
    a single hand release device disposed on said folding set, wherein the single hand release device includes a driver and a driving lever, with the driver located on the frame, with the driving lever pivotally connecting to the folding set and driving said folding set through a connecting element so as to fold the frame in the collapsible position;
    wherein two sides of said driving piece and the outer sides of said pair of steel pieces of the lower folding brace are connectably provided with a pair of connecting steel pieces, said driving lever pivotally affixed to one of the pair of steel pieces of the upper folding brace and a first end of said driving lever connected to said connecting element and a second end of the driving lever is close to said driving piece in the extended position.

2. The umbrella folding stroller of claim 1, wherein one end of said connecting element of said single hand release device is connected to said driver, and another end of the connecting element is connected to a driving sleeve, wherein said driving sleeve is slidably mounted on said frame of said umbrella folding stroller, with the second end of said driving lever pivotally affixed to said driving sleeve.

3. The umbrella folding stroller of claim 1, wherein an arresting member is slidably mounted on said frame above said driver so that said arresting member stops rotation of the driver.

4. The umbrella folding stroller of claim 1, wherein an elastic element is hangingly disposed between said lower folding brace of said folding set so as to assist said frame of said umbrella folding structure to collapse.

\* \* \* \* \*